United States Patent
Lubera et al.

(10) Patent No.: US 7,320,157 B2
(45) Date of Patent: Jan. 22, 2008

(54) RESILIENT CLIP FASTENER

(75) Inventors: Daniel J Lubera, Roseville, MI (US); Jacob A Siudym, II, Emmett, MI (US); Robert Osterland, East China Township, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/514,069

(22) Filed: Aug. 31, 2006

(65) Prior Publication Data

US 2006/0288545 A1 Dec. 28, 2006

Related U.S. Application Data

(63) Continuation of application No. 09/813,592, filed on Mar. 21, 2001, now Pat. No. 7,168,138, which is a continuation-in-part of application No. 09/772,046, filed on Jan. 29, 2001, now abandoned.

(60) Provisional application No. 60/192,375, filed on Mar. 27, 2000.

(51) Int. Cl.
*A44B 21/00* (2006.01)
*F16B 5/12* (2006.01)

(52) U.S. Cl. ................................... 24/295

(58) Field of Classification Search .......... 24/289–295, 24/297, 453; 296/214; 52/716.7, 718.06, 52/718.03; 411/508–510, 182, 480, 533, 411/902, 903, 913, 45–48, 349, 173–175, 411/112; 403/408.1, 397
See application file for complete search history.

(56) References Cited

U.S. PATENT DOCUMENTS

| | | | |
|---|---|---|---|
| 1,873,871 A | 8/1932 | Carr | 24/289 |
| 2,032,315 A | 2/1936 | Chaffee | 24/295 |
| 2,181,966 A | 12/1939 | Dean | 24/295 |

(Continued)

FOREIGN PATENT DOCUMENTS

DE 1157434 11/1963

(Continued)

OTHER PUBLICATIONS

Blueprint 9851875; Clip-windshield side reveal molding; Fisher body division, General Motors Corp; Feb. 4, 1971.

(Continued)

*Primary Examiner*—James R Brittain
(74) *Attorney, Agent, or Firm*—Harness, Dickey & Pierce, P.L.C.

(57) ABSTRACT

A resilient clip with a plurality of twisted wings for engaging a first structure. The twisted wings provide the clip with a low ratio of insertion force to pull-out force, rendering the clip relatively easy to install yet difficult to pull out. In one embodiment, the resilient clip includes at least three wing members that cooperate to prevent the resilient clip from rotating relative to the first structure. In another embodiment, the resilient clip includes an engagement portion having a plurality of teeth for engaging a tab formed into a second structure. The teeth of the engagement portion engage the tab, permitting the resilient clip to be coupled to the second structure. When the resilient clip is engaged to the first structure, the teeth of the engagement portion cannot disengage the tab, rendering the resilient clip non-removably coupling the resilient clip to the first and second structures.

16 Claims, 16 Drawing Sheets

U.S. PATENT DOCUMENTS

| | | | |
|---|---|---|---|
| 2,198,186 A | 4/1940 | Tinnerman | 24/294 |
| 2,217,781 A | 10/1940 | Wiley | 24/295 X |
| 2,426,799 A | 9/1947 | Tinnerman | 411/173 |
| 2,509,192 A | 5/1950 | Poupitch | 411/508 |
| 2,618,998 A | 11/1952 | Poupitch | 411/520 |
| 2,692,414 A | 10/1954 | Poupitch | 24/293 |
| 2,825,948 A | 3/1958 | Parkin | 411/477 |
| 2,885,754 A | 5/1959 | Munse | 24/293 |
| 2,959,259 A | 11/1960 | Meyer | 52/718 |
| 2,961,723 A | 11/1960 | Hamman | 24/289 |
| 2,964,814 A | 12/1960 | Parkin | 24/293 |
| 3,034,615 A | 5/1962 | Kern | 24/292 |
| 3,310,929 A | 3/1967 | Garvey | 24/293 |
| 3,400,743 A | 9/1968 | Strange | 411/177 |
| 3,486,202 A | 12/1969 | Nelson | 24/292 |
| 3,864,789 A | 2/1975 | Leitner | 24/293 |
| 3,871,430 A | 3/1975 | Meyer | 24/323 |
| 3,939,752 A | 2/1976 | Koscik | 411/548 |
| 4,300,865 A | 11/1981 | Murray | 411/15 |
| 4,383,716 A | 5/1983 | Osborn | 24/295 |
| 4,402,118 A | 9/1983 | Benedetti | 24/289 |
| 4,448,376 A | 5/1984 | Behrendt | 248/27.3 |
| 4,595,325 A | 6/1986 | Moran et al. | 411/173 |
| 4,630,338 A | 12/1986 | Osterland et al. | 24/293 |
| 4,644,612 A | 2/1987 | Osterland | 24/295 |
| 4,668,145 A | 5/1987 | Hirohata | 411/508 |
| 4,844,533 A | 7/1989 | Dowd et al. | 296/214 |
| 4,865,505 A | 9/1989 | Okada | 411/512 |
| 4,893,866 A | 1/1990 | Dowd et al. | 296/214 |
| 4,902,068 A | 2/1990 | Dowd et al. | 296/214 |
| 4,913,484 A | 4/1990 | Dowd et al. | 296/97.12 |
| 4,925,351 A | 5/1990 | Fisher | 411/182 |
| 4,981,322 A | 1/1991 | Dowd et al. | 296/214 |
| 4,981,323 A | 1/1991 | Dowd et al. | 296/214 |
| 4,989,911 A | 2/1991 | Van Order | 296/97.9 |
| 5,056,853 A | 10/1991 | Van Order | 296/97.9 |
| 5,061,005 A | 10/1991 | Van Order et al. | 296/97.9 |
| 5,105,521 A | 4/1992 | Dowd et al. | 29/453 |
| 5,251,467 A * | 10/1993 | Anderson | 70/370 |
| 5,269,060 A | 12/1993 | Dowd et al. | 29/897.2 |
| 5,367,751 A | 11/1994 | DeWitt | 24/295 |
| 5,451,022 A | 9/1995 | Peterson | 248/289.11 |
| 5,499,854 A | 3/1996 | Crotty, III et al. | 296/97.13 |
| 5,542,158 A | 8/1996 | Gronau et al. | 24/295 |
| 5,560,575 A | 10/1996 | Krysiak | 248/222.12 |
| 5,632,061 A | 5/1997 | Smith et al. | 16/444 |
| 5,636,891 A | 6/1997 | Van Order et al. | 296/37.7 |
| 5,704,753 A | 1/1998 | Ueno | 411/509 |
| 5,752,853 A | 5/1998 | Curtindale | 439/567 |
| 5,758,987 A | 6/1998 | Frame et al. | |
| 5,759,004 A | 6/1998 | Kuffel | 411/508 |
| 5,774,949 A | 7/1998 | Cornell et al. | 24/293 |
| 5,852,849 A | 12/1998 | Lansing et al. | 24/3.4 |
| 5,857,735 A | 1/1999 | Alonso | 296/214 |
| 5,873,690 A | 2/1999 | Danby et al. | 411/182 X |
| 5,919,019 A | 7/1999 | Fischer | 411/182 |
| 5,991,976 A | 11/1999 | Adams et al. | |
| 5,992,914 A | 11/1999 | Gotoh et al. | 296/39.1 |
| 6,003,928 A | 12/1999 | Curtindale | 296/97.9 |
| 6,095,734 A | 8/2000 | Postadan | 411/182 |
| 6,101,686 A | 8/2000 | Velthoven et al. | 24/295 |
| 6,141,837 A * | 11/2000 | Wisniewski | 24/295 |
| 6,179,366 B1 | 1/2001 | Hansz | 296/97.9 |
| 6,234,558 B1 | 5/2001 | Curtindale | 296/97.9 |
| 6,381,811 B2 | 5/2002 | Smith et al. | 24/289 |
| 6,497,011 B2 | 12/2002 | Smith et al. | 24/295 |
| 6,527,471 B2 | 3/2003 | Smith et al. | 24/293 |
| 6,648,542 B2 | 11/2003 | Smith et al. | 24/293 |
| 6,691,380 B2 | 2/2004 | Vassiliou | 24/295 |
| 2002/0194710 A1 | 12/2002 | Dickinson et al. | 24/295 |
| 2003/0024077 A1 | 2/2003 | Vassiliou | 24/295 |
| 2003/0024078 A1 | 2/2003 | Vassiliou | 24/295 |

FOREIGN PATENT DOCUMENTS

| | | |
|---|---|---|
| DE | 2648467 | 4/1978 |
| EP | 0 930 440 A1 | 7/1999 |
| FR | 1477353 | 3/1967 |
| GB | 1 229 668 | 4/1971 |

OTHER PUBLICATIONS

4 Pictures illustrating a commercially available clip (12599 type), produced by USM Corp.

* cited by examiner

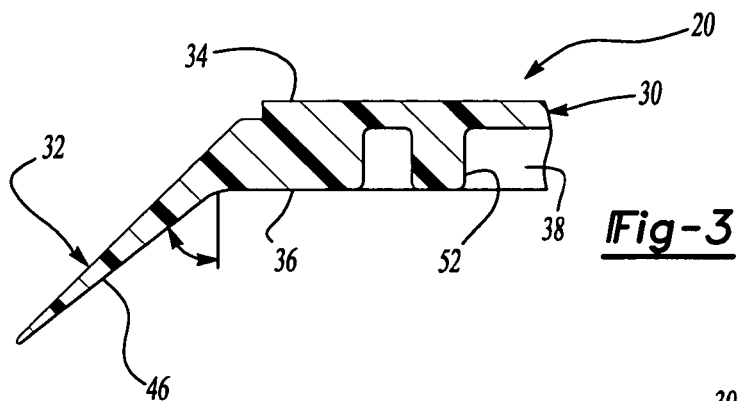
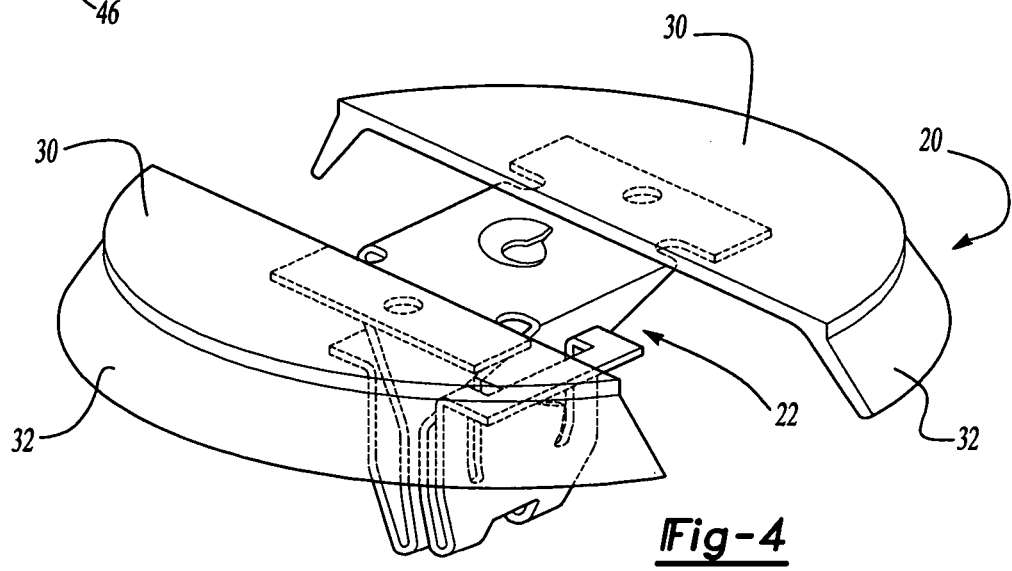
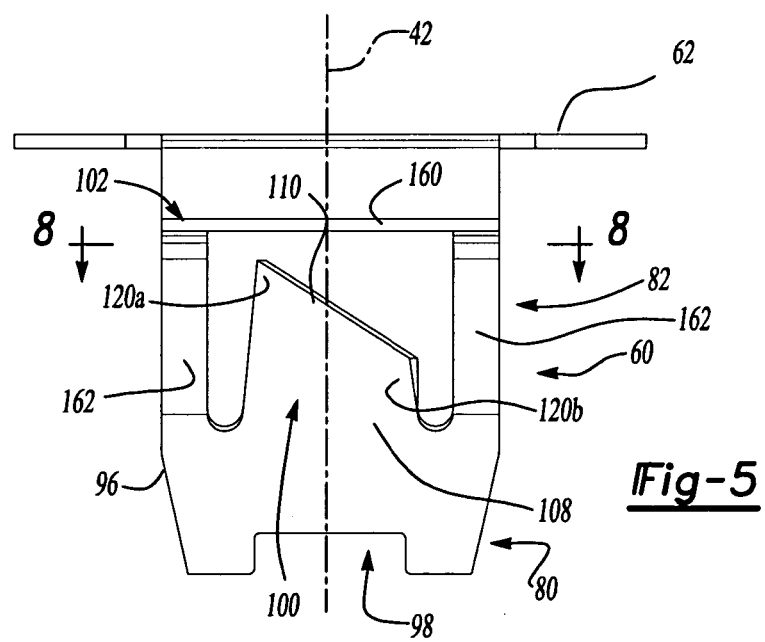

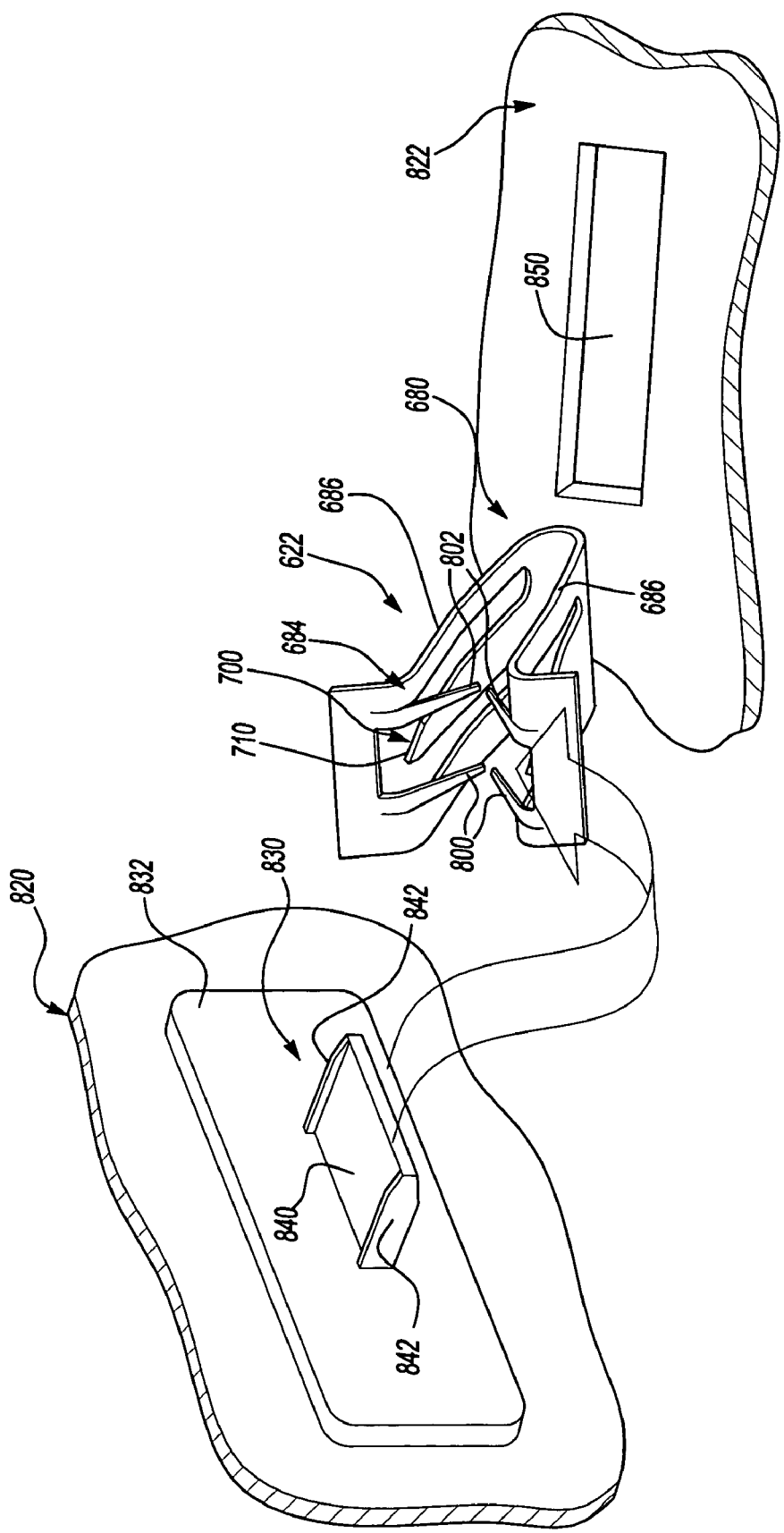

RESILIENT CLIP FASTENER

CROSS-REFERENCE TO RELATED APPLICATIONS

This application is a continuation of U.S. patent application Ser. No. 09/813,592, filed Mar. 21, 2001, entitled "Resilient Clip Fastener" (now U.S. Pat. No. 7,168,138, issued Jan. 30, 2007), which is a continuation-in-part of U.S. patent application Ser. No. 09/772,046, filed Jan. 29, 2001, entitled "Resilient Clip Fastener" (now abandoned), which claims the benefit of U.S. Provisional Application Ser. No. 60/192,375, filed Mar. 27, 2000, entitled "Fastener Assembly for Automotive Headliner".

INTRODUCTION

The present disclosure relates generally to resilient clip fasteners and more particularly to a resilient clip fastener that employs a plurality of wing members to secure the body portion of the resilient clip to a structure. More specifically, the present disclosure relates to a resilient clip fastener having a construction that utilizes wing member to permits the clip to be inserted with a relatively low insertion force while resisting relatively high withdrawal forces. The disclosure also relates to a resilient clip fastener having a construction that accounts in several manners for part-to-part variation between the structures that are to be fastened together.

Many current vehicles employ resilient clips to secure various components to the vehicle body. One such application concerns assist handles that mount to the roof of the vehicle above the doors. Such assist handles serve not only to provide occupants with a convenient point to grasp during ingress to and egress from the vehicle, but also enable occupants to stabilize their upper body during operation of the vehicle. In order to serve these functions, it is necessary for such assist handles to withstand loads of upwards of 250 pounds force without pulling away form the anchor points in the sheet metal of the vehicle.

During assembly of the vehicle, it is conventional procedure of the entire headliner assembly to be installed onto the interior roof of the vehicle in a single operation. In other words, the headliner assembly, with the assist handles and other roof mounted components already attached, is passed through either the windshield or backlight opening of the vehicle body on the assembly line and then the headliner assembly is secured by line operators to the interior roof of the vehicle. In order to accomplish this assembly task, the headliner assembly is typically equipped with numerous fasteners, located around the periphery of the headliner assembly as well as at predetermined locations around the interior area of the headliner, that are adapted to penetrate through corresponding holes located in the reinforcing sheet metal members of the roof. It is the responsibility of the line operators to properly orient the headliner assembly beneath the interior roof of the vehicle and press the fasteners into the various mounting holes in the reinforcing sheet metal members to secure the headliner assembly to the roof of the vehicle.

For aesthetic reasons, the headliner fasteners are typically secured in some fashion to the backside of the headliner so that they are not visible from the interior of the vehicle after the headliner assembly is installed. Consequently, it is often incumbent upon the line operators to blindly "feel" for the location of the mounting holes with their fingers before pressing the fasteners into the holes from the opposite show-surface side of the headliner.

Due to slight misalignments which can occur between the fasteners and their corresponding mounting holes, some of the fasteners may not be properly seated and secured to the sheet metal. This condition is especially problematic when dealing with the fasteners that serve to anchor the roof mounted assist handles. Because these fasteners must withstand substantially higher removal forces than the fasteners that serve merely to hold the headliner in place, they are typically less forgiving of misalignment problems, which can result in a significant increase in the required insertion force, thus greatly increasing the likelihood of improper installation. Under the circumstances, the removal forces that the fasteners can withstand before separating from the sheet metal are greatly compromised.

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner which minimizes vibration and the concomitant noise problems that are often associated with such fasteners.

SUMMARY

In one form, the present teachings provide a resilient clip for engaging a structure. The resilient clip includes a flange portion, an insertion portion and a retaining portion. The flange portion is configured to abut an outer surface of the structure. The insertion portion is coupled to the flange portion and is configured to be inserted into a hole formed into the structure. The retaining portion is coupled to the insertion portion and includes at least three wing members. Each of the wing members is twisted about an associated axis and terminates at a tip portion that is configured to engage the structure.

In another form, the present teachings provide a resilient clip for coupling a first structure, which has a fastening tab, to a second structure, which has a clip aperture. The resilient clip includes a body portion and an engagement portion. The body portion has a pair of flanges and first and second wing members, with each of the wing members having a base portion that is coupled to an associated one of the flanges. The first wing member is twisted about a first axis in a first direction and the second wing member is twisted about a second axis in the first direction. Each of the wing members terminates at a tip portion that is angled downwardly toward the base portion such that a portion of each of the wing members nearest a central axis of the body portion extends above an associated portion of each of the wing members that is furthest from the central axis of the body portion. The tip portions are configured to engage a first side of the structure to secure the resilient clip to the second structure. The engagement portion has a plurality of teeth that extend inwardly toward the central axis of the body portion and downwardly toward the base portions of the wing members. The plurality of teeth are configured for engaging the first structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a sectional view of a portion of the fastener of FIG. 1 illustrating the spacing structure in greater detail;

FIG. 4 is a perspective view of a fastener constructed in accordance with the teachings of an alternate embodiment of the present disclosure;

FIG. 5 is a front view of a portion of the fastener of FIG. 1, illustrating the clip structure in greater detail;

FIG. 24 is an exploded perspective view illustrating an application for the fastener of FIG. 21 wherein the fastener is employed to secure an interior trim component to a vehicle body structure.

DETAILED DESCRIPTION OF THE VARIOUS EMBODIMENTS

Figure 1:
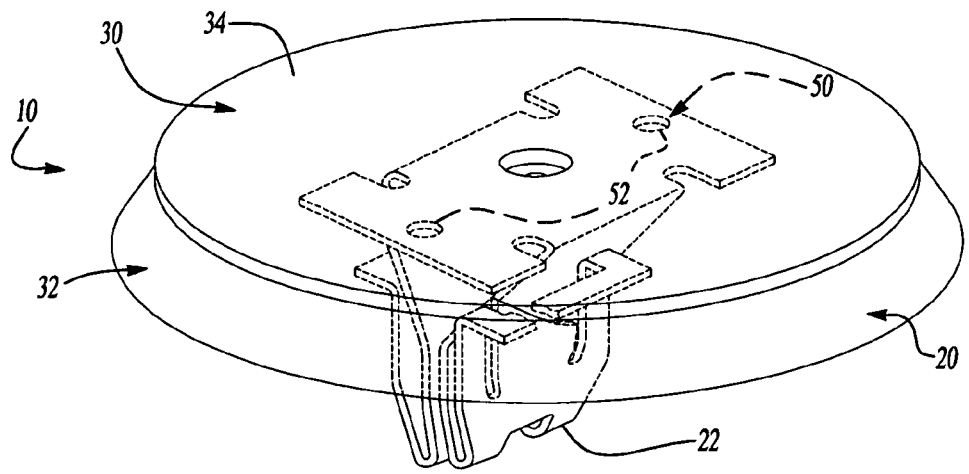
FIG. 1 is a perspective view of a fastener constructed in accordance with the teachings of the present disclosure.
Figure 2:
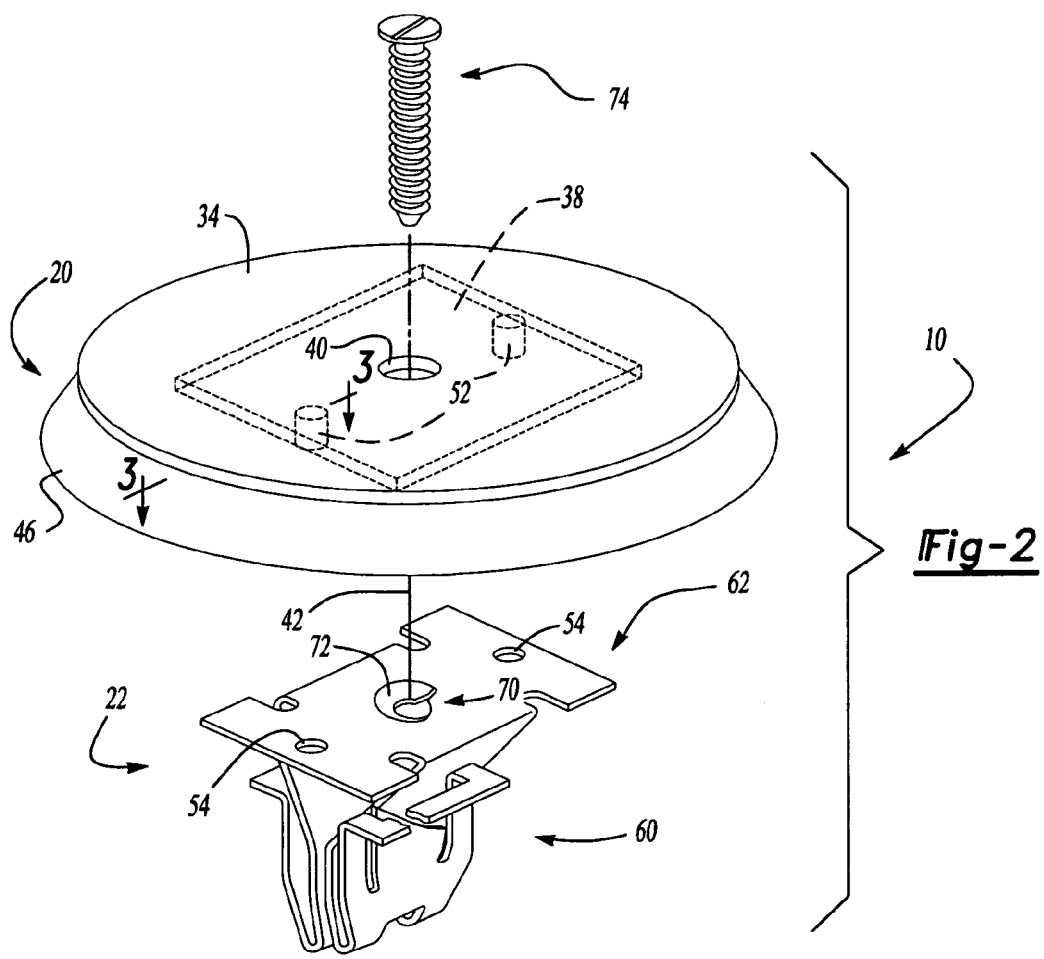
FIG. 2 is an exploded perspective view of the fastener of FIG. 1.

With reference to FIGS. 1 and 2 of the drawings, a resilient clip fastener constructed in accordance with the teachings of a first embodiment of the present disclosure is generally indicated by reference numeral 10. Fastener 10 is illustrated to include a spacing structure 20 and a clip structure 22. Spacing structure 20 is preferably unitarily formed from a resilient material, such as plastic, with materials such as polypropylene being particularly well suited for automotive applications. Spacing structure 20 is shown to include a first flange member 30 and a second flange member 32. With additional reference to FIG. 3, the outer surface 34 of the first flange member 30 is substantially flat while the inner surface 36 of the first flange member 30 includes a recess 38. A mounting hole 40 is formed through the center of the first flange member 30 along a central axis 42 of the fastener 10.

In the particular embodiment illustrated, the first flange member 30 is circular in shape and the second flange member 32 is frusto-conical in shape, extending entirely around the perimeter of the first flange member 30 in a continuous and unbroken manner. The second flange member 32 is formed from a wall member 46 that is coupled to an edge of the first flange member 30 and which tapers both outwardly from the first flange member 30 and downwardly toward the clip structure 22. In the example provided, the wall member 46 extends from first flange member 30 at an angle of approximately 45 degrees. The wall member 46 is substantially thinner than first flange member 30, which permits the wall member 46 to deflect outwardly in a resilient manner when a force is applied to the first flange member 30 in a direction normal to the outer surface 34. Configuration in this manner advantageously permits spacing structure 20 to function as a spring for purposes which will be discussed in detail, below. In the particular example provided, the thickness of the first flange member 30 is about 0.090 inches, which the thickness of the tip of wall member 46 is about 0.020 inches.

Those skilled in the art will understand, however, that the spacing structure 20 may be constructed somewhat differently. For example, the first flange member 30 may be formed in another shape, such as an oval; the second flange member 32 may be formed to extend only partially around the perimeter of the first flange member; and/or the second flange member 32 may include a plurality of scallops or stiffening ribs (not shown) which operate to reduce of increase, respectively, the stiffness of the second flange member 32 in a desired manner. Those skilled in the art will also understand that the spacing structure 20 may also be configured to include a plurality of first and second flange members 30 and 32, as shown in FIG. 4, with each of the first flange members 30 and an associated one of the second flange members 32 being coupled to a separate portion of the clip structure 22.

Returning to FIGS. 2 and 3, the first flange member 30 is coupled to the clip structure 22 via a coupling mechanism 50. Coupling mechanisms are well known in the art and need not be discussed in significant detail herein. In the example provided, the coupling mechanism 50 is illustrated to include a plurality of weld protrusions 52 that are configured to be inserted into associated protrusion apertures 54 formed into the clip structure 22. The weld protrusions 52 are thereafter permanently deformed, by heating, for example, to fixedly couple the spacing structure 20 to the clip structure 22.

Returning to FIG. 2, clip structure 22 is illustrated to include a body portion 60 and a flange portion 62. Clip structure 22 is preferably unitarily formed from a spring steel material, such as SAE 1050 steel that has been austempered to a hardness of about 30 to 50 on the Rockwell "C" scale and finished with an appropriate rust resistant finish, such as zinc plating.

Flange portion 62 is shown to be generally rectangular and sized to fit in the recess 38 in the first flange member 30. In addition to the protrusion apertures 54, the flange portion 62 includes a key-hole aperture 70 that is aligned to the central axis 42 of the fastener 10. The key-hole aperture 70 includes a helical lip 72 that is formed in a manner that is well known in the art. The key-hole aperture 70 is sized to receive a threaded fastener 74, with the helical lip 72 engaging the threads of the threaded fastener 74.

Figure 6:
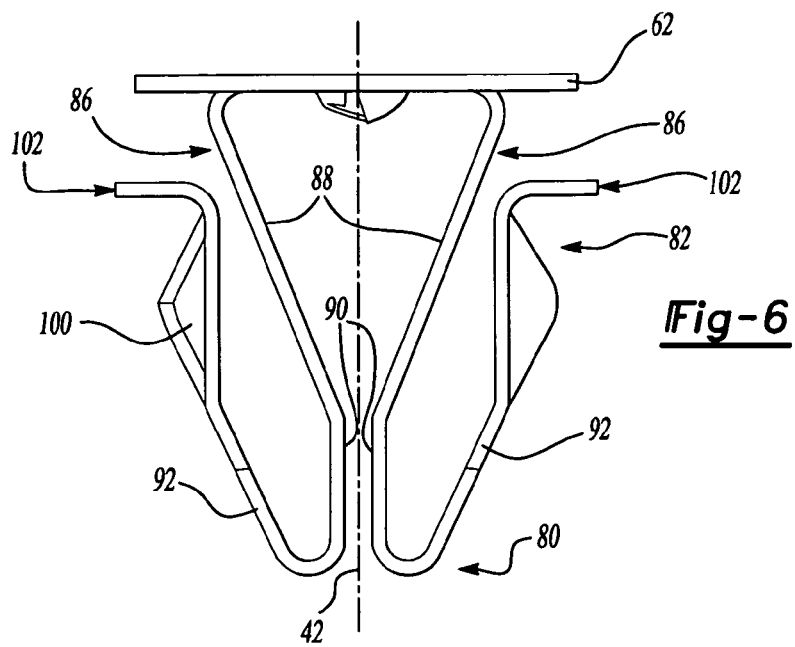
FIG. 6 is a side elevation view of the fastener of FIG. 1.
Figure 7:
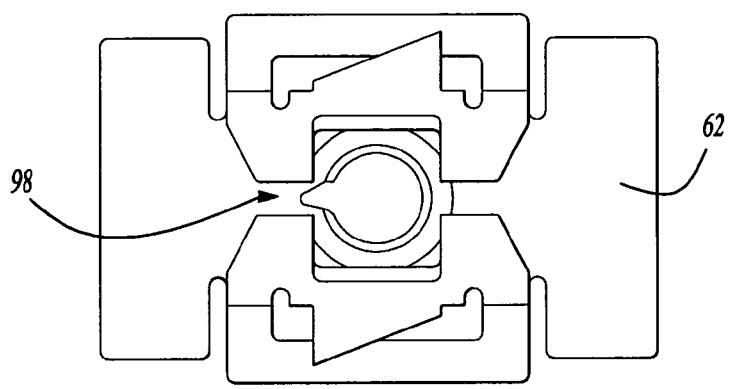
FIG. 7 is a bottom view of the fastener of FIG. 1.

With additional reference to FIGS. 5 through 7, the body portion 60 is shown to include an insertion portion 80 and a retaining portion 82. In the particular embodiment illustrated, the insertion portion 80 is shown to include a pair of flanges 86 with each of the flanges 86 having a first portion 88, a second portion 90 and a third portion 92. The first portion 88 is coupled to the flange portion 62 at a first end and tapers inwardly toward the central axis 42 and downwardly away from the flange portion 62. The second portion 90 is coupled to an opposite end of the first portion 88 and depends downwardly therefrom in a direction generally parallel the central axis 42. The third portion 92 is coupled to the opposite end of the second portion 90, tapering outwardly from the central axis 42 and upwardly toward the flange portion 62. The first, second and third portions 88, 90 and 92 are configured in a manner so as to resiliently position the retaining portion 82 relative to the flange portion. The resilient positioning of the retaining portion 82 facilitates the installation of the fastener 10 as will be discussed in further detail, below.

In the particular embodiment illustrated, the flanges 86 also include a pair of tapered sides 96 and a fastener aperture 98 that is formed into the first, second and third portions 88, 90 and 92. The tapered sides 96 taper downwardly from the flange portion 62 and inwardly toward the central axis 42, thereby narrowing the tip of the insertion portion 80 to render the clip structure 22 easier to install. The fastener aperture 98 is primarily configured to provide clearance for the threaded fastener 74 but those skilled in the art will understand that the fastener aperture 98 may additionally or alternatively be employed to increase the flexibility of the insertion portion 80.

Figure 8:
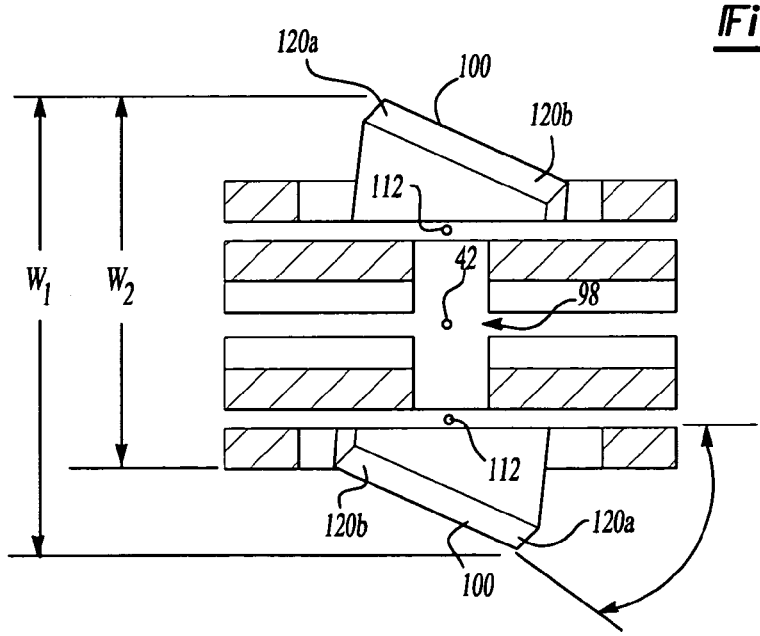
FIG. 8 is a sectional view taken along the line 8-8 of FIG. 5.
Figure 9:
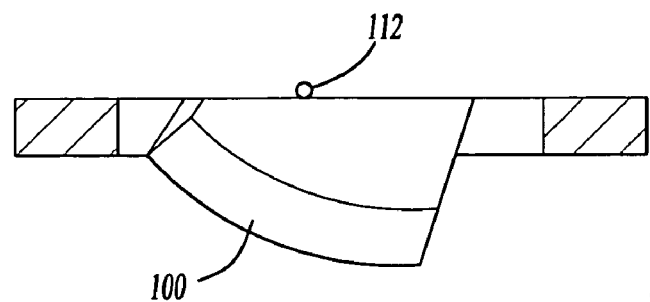
FIG. 9 is a partial sectional view similar to that of FIG. 8 but illustrating an alternate manner of twisting the wing members.

The retaining portion 82 is shown to include a pair of wing members 100 and a pair of abutting flanges 102. Each of the wing members 100 includes a base portion 108 that is fixedly coupled to the insertion portion 80. Each of the wing members 100 extends upwardly from its base portion 108 and terminates at a tip portion 110. With reference to FIGS. 5 and 8, each of the wing members 100 is illustrated to be twisted about an axis 112 in a first rotational direction such that the angle between the base portion 108 and the tip portion 110 is about 5° to about 45° and more preferably about 30°. As shown, the wing members 100 may be twisted in a manner such that each tip portion 110 lies substantially in a single plane and is parallel to the other tip portion 110. Those skilled in the art will understand, however, that each tip portion 110 may alternatively be twisted in a helical manner about their associated axis 112 as illustrated in FIG. 9.

Figure 10:
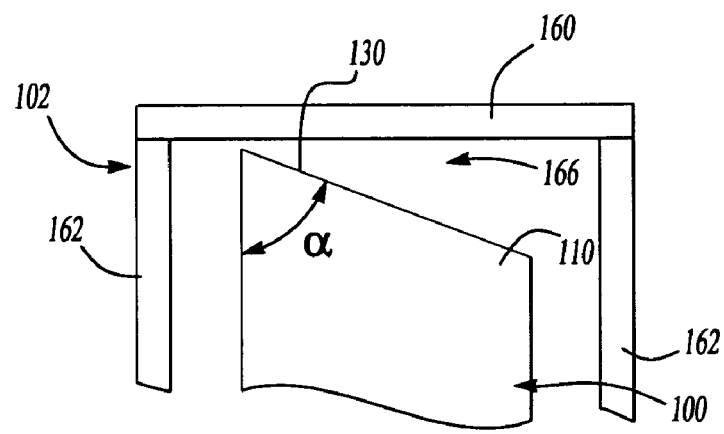
FIG. 10 is an enlarged portion of FIG. 5, illustrating the construction of the tip portion of the wing member in greater detail.
Figure 11:
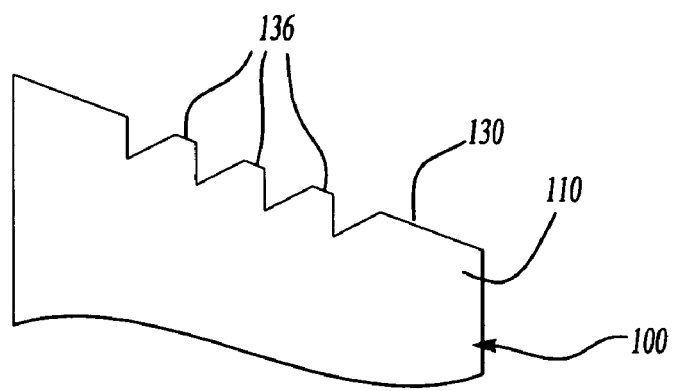
FIG. 11 is a view similar to that of FIG. 10 but illustrating an alternate manner of forming the tip portion.

Returning back to FIGS. 5 and 8, the tip portions 110 are shown to be angled such that the lateral end 120a of the tip portion 110 nearest the central axis 42 extends above the opposite lateral end 120b (i.e., the lateral end closest the central axis 42 is also closest to the flange portion 62). With additional reference to FIG. 10, the included angle, α, of the tip portion 110 ranges from about 30° to about 80° and is more preferably about 60°. In the particular embodiment illustrated, the tip portion 110 includes a flat edge 130. As shown in FIG. 11, however, a plurality of teeth 136 may also be formed into the edge 130 of the tip portion 110. Returning back to FIG. 8, those skilled in the art will understand the construction of the wing members 100 in this manner provides the fastener 10 with an effective width of "W1" for purposes of retaining the clip structure 22 to another structure, but a narrower insertion width of "W2" for purposes of installing the clip structure 22 due to the point-loading of the tip portions 110 during the installation process.

Figure 12:
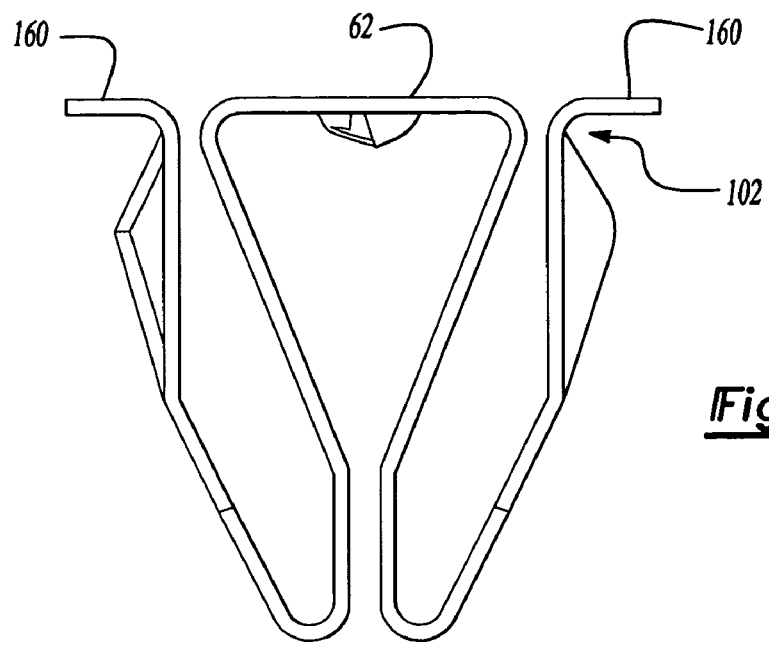
FIG. 12 is a side elevation view of a fastener similar to that of FIG. 1 but having a flange portion and a base that are disposed in a common plane to reduce the installation height of the fastener.

Returning to FIG. 5, each of the abutting flanges 102 is generally U-shaped, having a base 160 that is disposed between a pair of legs 162. In the example provided, the legs 162 are coupled to the third portion 92 of an associated one of the flanges 86, extending upwards generally parallel the central axis 42 such that the base 160 is positioned above the tip portion 110 by a predetermined distance. The configuration of the abutting flange 102 is such that the abutting flange 102 is disposed at least partially over an associated one of the wing members 100, creating a gap 166 having a vertical thickness that varies due to the angle α of the tip portion 110. Those skilled in the art will understand that the retaining portion 82 may be configured to position the gap 166 relative to the flange portion 62 in a desired manner. In the particular embodiment illustrated, the bases 160 of the abutting flanges 102 are spaced apart from the flange portion 62 to thereby position the gap 166 below the flange portion 62. Another example is illustrated in FIG. 12 where the bases 160 of the abutting flanges 102 and the flange portion 62 are disposed within a common plane so as to reduce the installed height of the clip structure 22.

Figure 14:
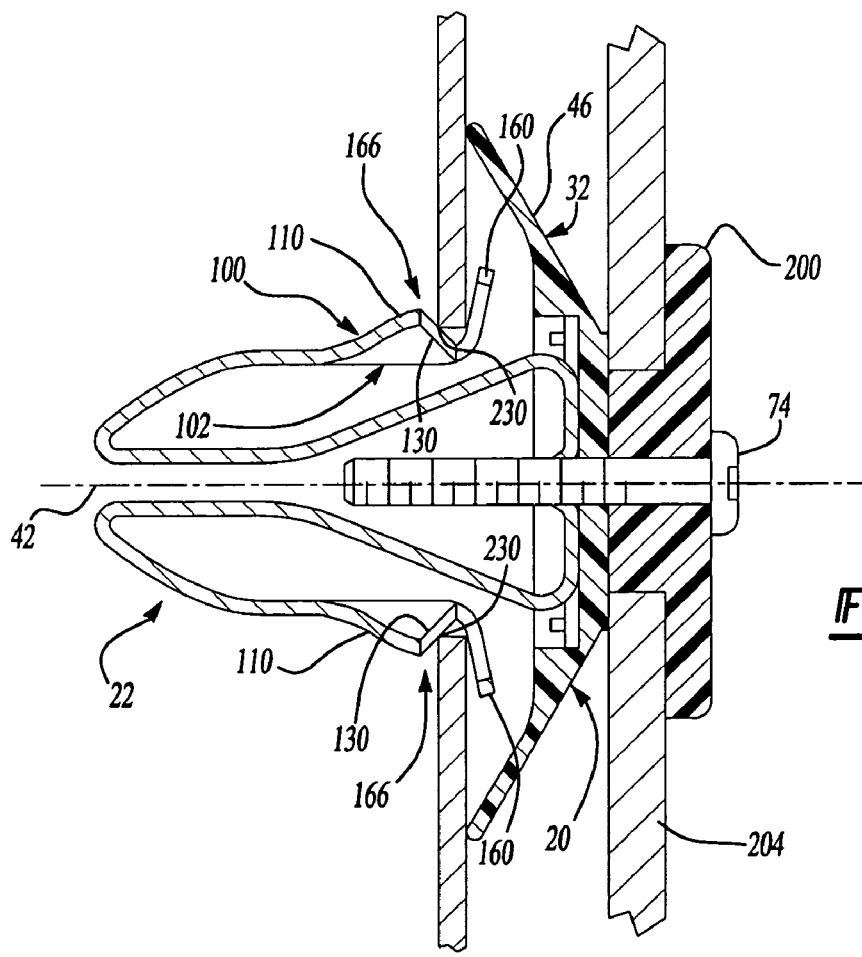
FIG. 14 is a partial sectional view taken along the line 14-14 of FIG. 13 showing the fastener in a fully installed condition.
Figure 13:
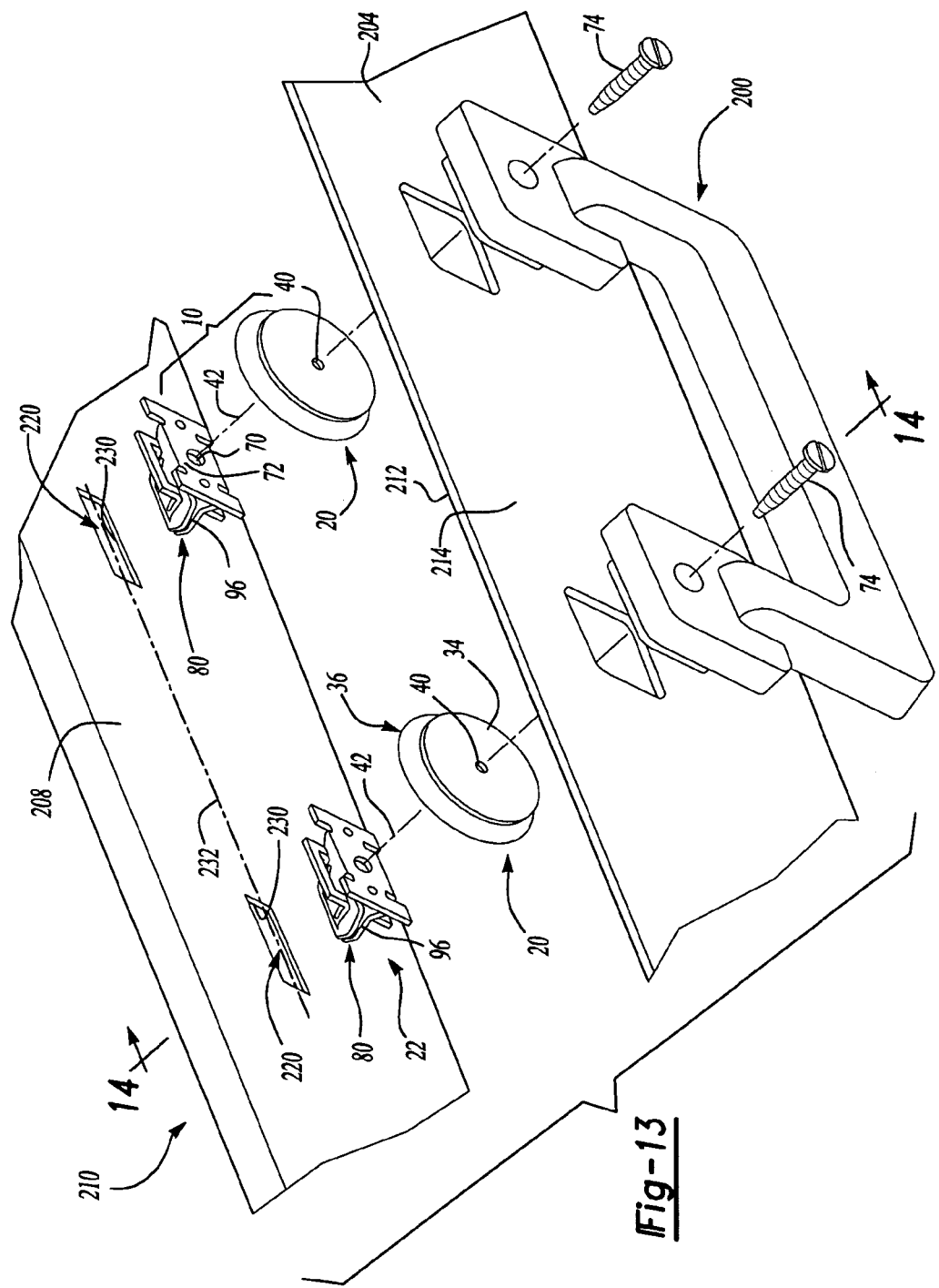
FIG. 13 is an exploded perspective view of a vehicle illustrating an application for the fastener of FIG. 1 wherein the fastener is employed to secure a headliner and assist handle to the roof of a vehicle.

One use for the fastener 10 is illustrated in FIGS. 13 and 14. In this example, the fastener 10 is employed to retain an assist handle 200 and a headliner 204 to the roof 208 of a vehicle 210. The fastener 10 is initially positioned such that the outer surface 34 of the spacing structure 20 abuts the rear surface 212 of the headliner 204. The assist handle 200 is positioned against the front surface 214 of the headliner 204 and a threaded fastener 74 is placed through the assist handle 200, the headliner 204, the mounting hole 40 in the spacing structure 20 and threadably engaged to the helical lip 72 of the key-hole aperture 70. Threaded engagement of the threaded fastener 74 and the helical lip 72 produces a clamping force that fixedly but removably retains the assist handle 200 and headliner 204 to the fastener 10. The resultant headliner subassembly (i.e., the assist handle 200, the headliner 204, the fastener 10 and the threaded fastener 74) is next inserted through the windshield aperture or backlite aperture (not shown) in the vehicle 210 and is positioned such that the fastener 10 is proximate a slotted aperture 220.

The tapered sides 96 of the insertion portion 80 facilitate the alignment of the clip structure 22 to the slotted aperture 220, thereby reducing the need for the technician to push the fastener 10 against the roof 208 and "feel" for the slotted aperture 220. Once the clip structure 22 and the slotted aperture 220 are aligned, the technician applies an upwardly directed insertion force to the assist handle 200, pushing the clip structure 22 into the slotted aperture 220. The combination of the insertion force and contact between the edge 230 of the slotted aperture 220 and the wing members 100 causes the wing members 100 to deflect inwardly toward the central axis 42 until the roof 208 is disposed within the gap 166 between the tip portion 110 and the abutting flange 102. The configuration of the abutting flange 102 prevents the technician from seating the fastener 10 too deeply. Preferably, the wing members 100 are sized such that the edges 130 of the tip portions 110 engage the edges 230 of the slotted aperture 220, causing the wing members 100 to exert a force which tends to align the central axis 42 to an axis 232 of the slotted aperture 220. Construction of the fastener 10 in this manner is highly advantageous in that it enables the clip structure 22 to be engaged to the roof 208 with a relatively low insertion force yet resist withdrawal from the roof 208 even when relatively large forces are applied to the assist handle 200. In this regard, the wing members 100 can be configured to provide the fastener 10 with a ratio of insertion force to pull-out force of about 0.04 to about 0.12, and more preferably of about 0.04 to about 0.10. In the particular embodiment illustrated, the fastener may be seated with an insertion force of 20 pounds force and pulled out with a pull-out force of about 350 pounds force, thereby providing a ratio of insertion force to pull-out force of about 0.057.

Furthermore, as the angled tip portions 110 positively engage the edges 230 of the slotted aperture 220, the alignment of the fastener 10 relative to the roof 208 does not change, even when the threaded fastener 74 is removed. Construction of the fastener 10 in this manner is highly advantageous in that it eliminates the need to re-align the fastener 10 to the roof 208, headliner 204 and assist handle 200 after the headliner 204 has been removed, as when, for example, servicing of a vehicle sunroof or an overhead wire harness is necessary. This aspect of the present disclosure is also advantageous in that it permits the fastener 10 to tolerate a higher degree of variation in the size and location of the slotted aperture 220. Accordingly, the length of the slotted aperture 220 may sized larger than the width of the clip structure 22 without concern that the fastener 10 will move relative to the roof 208 and generate squeaks, buzzes or rattles.

Similarly, variances in the distance between the roof 208 and the headliner 204 are accommodated by the second flange member 32 of the spacing structure 20. In such instances, the wall member 46 is deflected to a greater or lesser extent after the tip portions 110 of the wing members 100 have engaged the roof 208. The spacing structure 20, by virtue of its spring-like construction, also exerts a force onto the roof 208 with further inhibits the clip structure 22 from moving relative to the roof 208.

Figure 15:
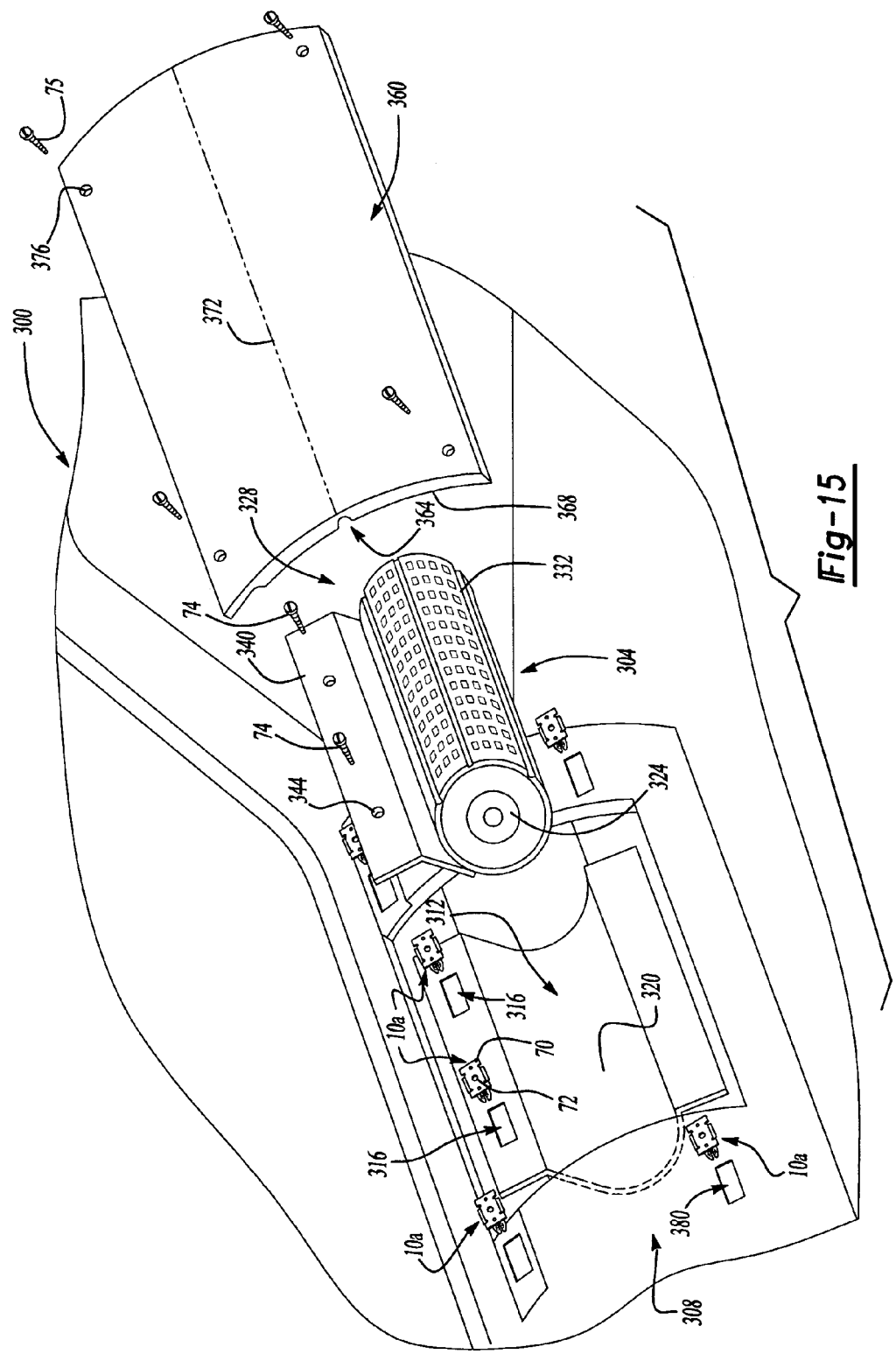
FIG. 15 is an exploded perspective view of a vehicle illustrating an application for a fastener similar to that of FIG. 1 wherein several of the fasteners are employed to secure an airbag module and a trim cover to a vehicle body structure.

Another example is illustrated in FIG. 15 wherein the fastener 10*a* is illustrated in operative association with a vehicle 300 and a passenger side airbag module 304. Those skilled in the art will understand that reference to a passenger side airbag module is merely exemplary and as such, it will be understood that the teachings of the present disclosure have applicability to other types of airbag modules, including side-deploying airbag modules and side-curtain airbag modules. In this example, the fastener 10*a* is substantially similar to the fastener 10, except that the fastener 10*a* does not include a spacing structure 20. As illustrated, the vehicle 300 includes a dash panel or body structure 308 that defines an airbag aperture 312. The airbag aperture 312 includes a plurality of slotted apertures 316 and a recessed cavity 320 that is sized to receive the airbag module 304. The airbag module 304 is conventional in its construction and operation and need not be discussed in detail herein. Briefly, the airbag module 304 includes an inflator 324 and a reaction canister assembly 328 having a reaction canister 332 and an inflatable airbag 336. The reaction canister 332 includes a mounting flange 340 having a plurality of holes 344, each of which is sized to receive a threaded fastener 74.

The threaded fasteners 74 are inserted through the holes 344 in the mounting flange 340 and threadably engaged to the helical lip 72 in the flange portion 62 of the fastener 10*a*. The assembly (i.e., airbag module 304, threaded fasteners 74 and fasteners 10*a*) is then placed into the recessed cavity 320, the insertion portion 80 of the fasteners 10*a* are aligned to the slotted holes 344 in the airbag aperture 312 and a force is exerted onto the airbag module 304 to insert the fasteners 10*a* into the slotted apertures 316 and engage the wing members 100 to the body structure 308. Construction in this manner is advantageous in that because the fastener 10*a* can be assembled to the airbag module 304 in an off-line operation, the installation of the airbag module 304 to the vehicle 300 is extremely simple and fast. Furthermore, the high pull-out force that is associated with the fastener 10*a* ensures that the airbag module 304 will remain coupled to the body structure 308 while the airbag 336 is being deployed.

Additional quantities of the fastener 10*a* are employed to secure a trim cover 360 over the recessed cavity 320 in the body structure 308. The trim cover 360 conventionally includes a notch 364 that extends along its inside surface 368 and defines a parting line 372. The trim cover 360 also includes a plurality of through-holes 344, each of which is sized to receive a threaded fastener 74 that is adapted to secure the trim cover 360 to the body structure 308. In an off-line operation similar to that employed for the airbag module 304, the threaded fasteners 74 are employed to secure the fasteners 10*a* to the trim cover 360. The trim cover 360 is thereafter positioned against the body structure 308, a force is exerted through the trim cover 360 and the fasteners 10*a* are engaged to slotted apertures 380 that are disposed around the perimeter of the recessed cavity 320.

During the deployment of the airbag module 304, gases generated by the inflator 324 fill the airbag 336, causing the inflating airbag 336 to exert a force onto the trim cover 360. Ideally, the force exerted onto the trim cover 360 causes the trim cover 360 to rip along the parting line 372 defined by the notch 364. With the known prior art fasteners, it may be possible for the airbag 336 to dislodge all or part of the trim cover from the body structure 308, rather than cause the trim cover 360 to rip. The relatively high pull-out force of the fastener 10*a* ensures that the trim cover 360 will remain securely fastened to the body structure 308 so that the force exerted by the inflating airbag 336 will cause the trim cover 360 to rip along the parting line 372.

Figure 16:
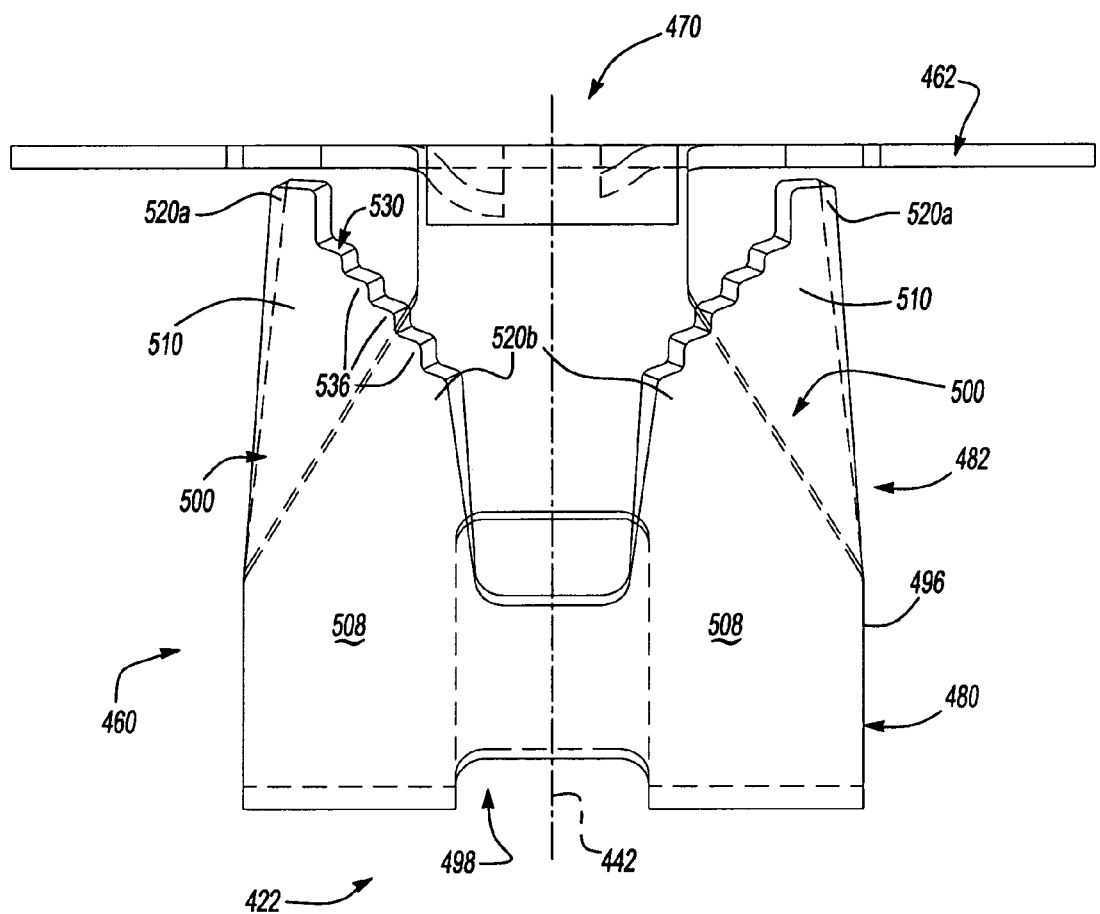
FIG. 16 is a front view of a clip structure constructed in accordance with the teachings of another preferred embodiment of the present disclosure.
Figure 17:
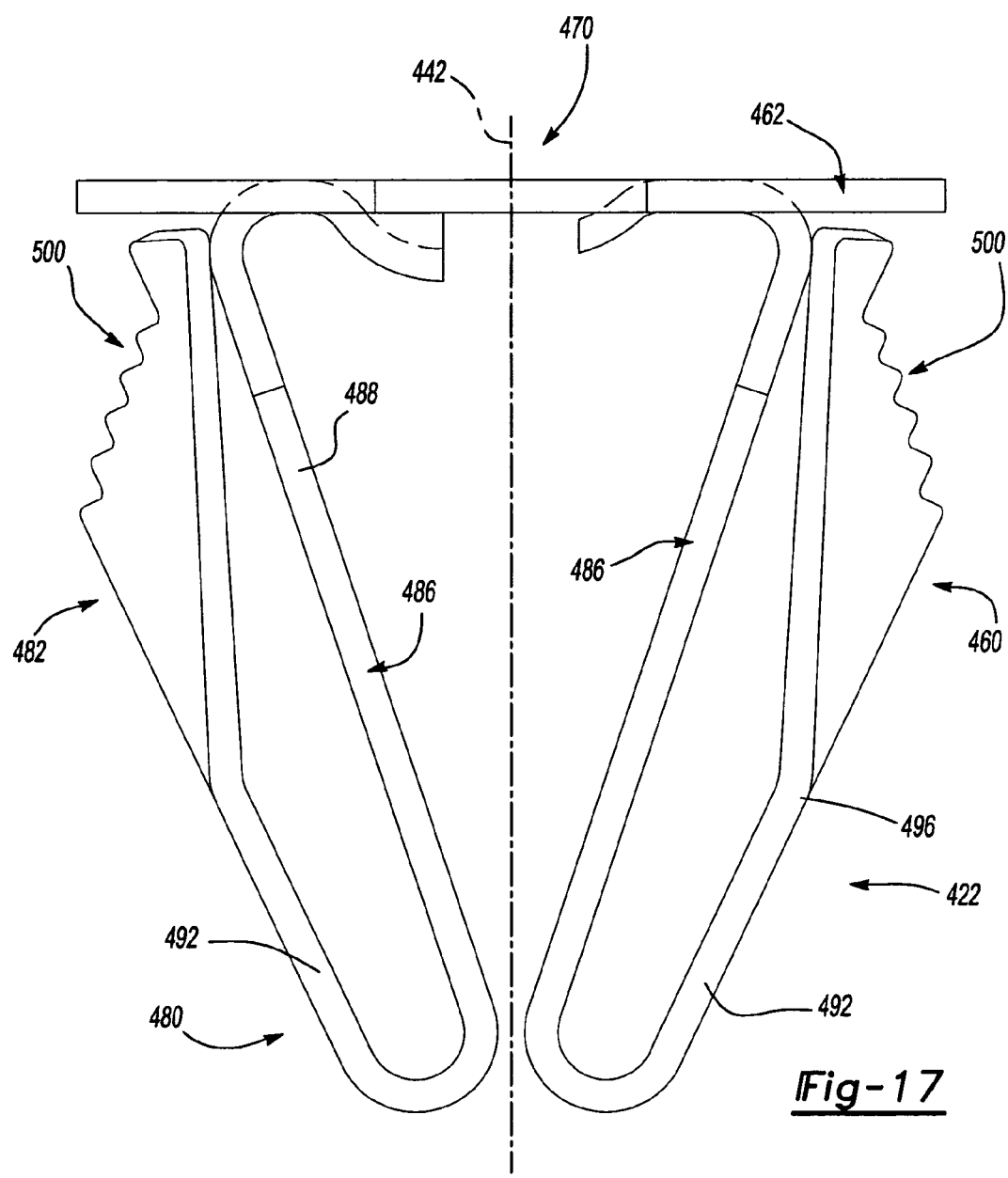
FIG. 17 is a side view of the clip structure of FIG. 16.
Figure 18:
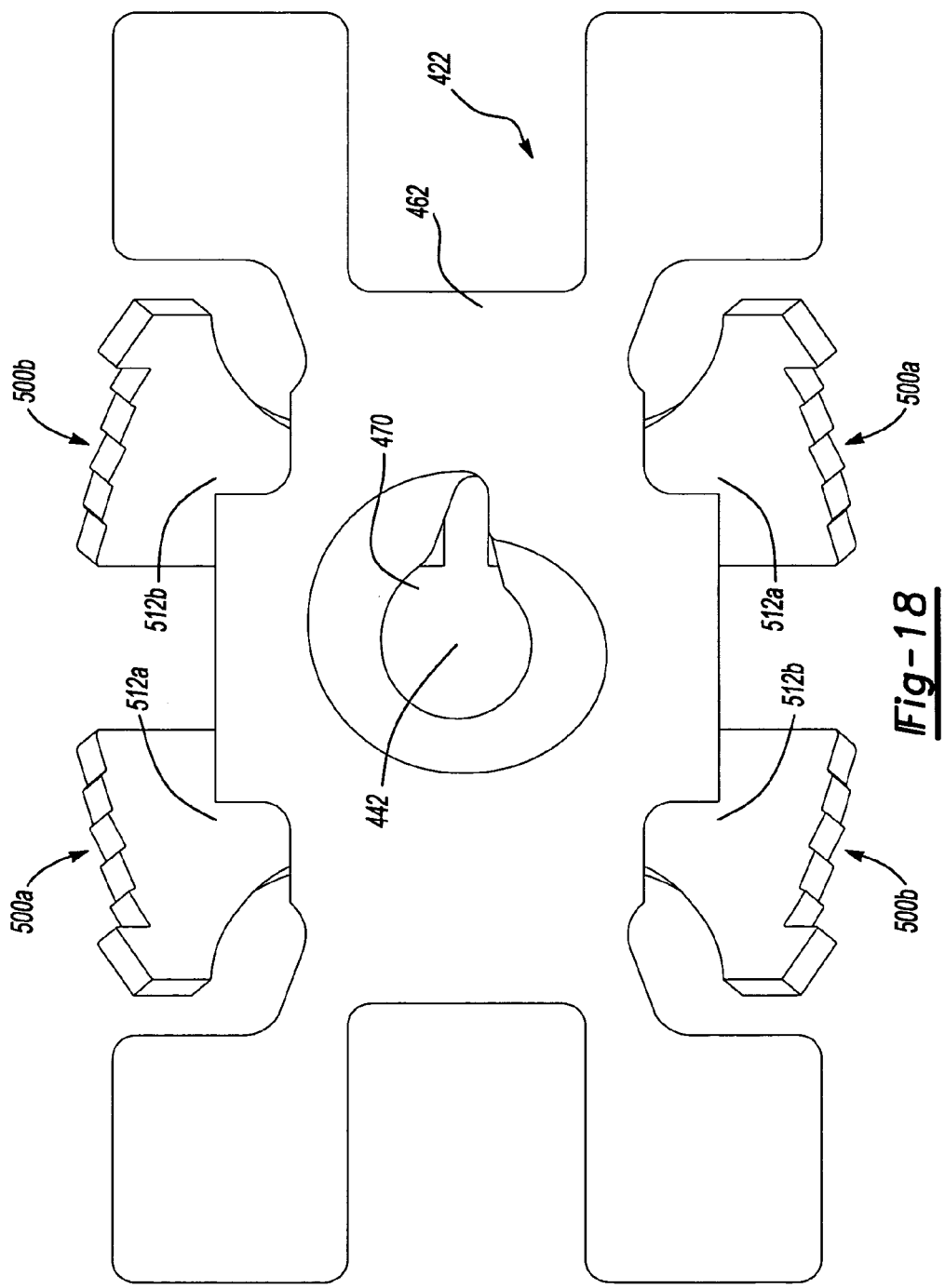
FIG. 18 is a top view of the clip structure of FIG. 16.

In FIGS. 16 through 18, a clip structure constructed in accordance with the teachings of another preferred embodiment of the present disclosure is generally indicated by reference numeral 422. The clip structure 422 is shown to be somewhat similar to the clip structure 22 in that it includes a body portion 460 and a flange portion 462. The flange portion 462 is shown to be generally rectangular and includes a key-hole aperture 470 that is identical in its configuration and use to that of key-hole aperture 70.

The body portion 460 is shown to include an insertion portion 480 and a retaining portion 482. In the particular embodiment illustrated, the insertion portion 480 is shown to include a pair of flanges 486, with each of the flanges 486 having a first portion 488 and a second portion 492. The first portion 488 is coupled to the flange portion 462 at a first end and tapers inwardly toward the central axis 442 and downwardly away from the flange portion 462. The second portion 492 is coupled to an opposite end of the first portion 488 and tapers outwardly from the central axis 442 and upwardly toward the flange portion 462. The first and second portions 488 and 492 are configured in a manner so as to resiliently position the retaining portion 482 relative to the flange portion 462. The resilient positioning of the retaining portion 482 facilitates the installation of the clip structure 422 as will be discussed in further detail, below.

In the particular embodiment illustrated, the flanges 486 also include a pair of tapered sides 496 and a fastener aperture 498 that is formed into the first and second portions 488 and 492. The tapered sides 496 taper downwardly from the flange portion 462 and inwardly toward the central axis 442, thereby narrowing the tip of the insertion portion 480 to render the clip structure 422 easier to install. The fastener aperture 498 is primarily configured to provide clearance for a threaded fastener, (e.g., threaded fastener 74 shown in FIG. 2) but those skilled in the art will understand that the fastener aperture 498 may additionally or alternatively be employed to increase the flexibility of the insertion portion 480.

The retaining portion 482 includes at least three wing members 500 and as shown in the particular example provided, preferably four wing members 500. Each of the wing members 500 includes a base portion 508 that is fixedly coupled to the insertion portion 480. Each of the wing members 500 extends upwardly from its base portion 508 and terminates at a tip portion 510. In a manner similar to that illustrated in FIG. 8, each of the wing members 500 are twisted about a respective axis such that the angle between the base portion 508 and the tip portion 510 is about 5° to about 45° and more preferably about 30°. In the particular example provided, wing members 500a are illustrated to be twisted about their axes 512a in a first rotational direction and wing members 500b are twisted about their axes 512b in a second rotational direction opposite the first rotational direction. As shown, the wing members 500 are twisted such that each tip portion 510 lies substantially in a single plane and is parallel to the wing member 500 that is located cross-corner to it (i.e., the tip portion 510 of the wing members 500a are parallel one another and the tip portion 510 of the wing members 500b are parallel one another). Those skilled in the art will understand, however, that each tip portion 510 may alternatively be twisted in a helical manner similar to the manner in which the tip portion 110 of the clip structure 22 is shown to be formed in FIG. 9.

Returning to FIGS. 16 through 18, the tip portions 510 are shown to be angled such that the lateral end 520a of the tip portion 510 that is nearest the central axis 442 extends above the opposite lateral end 520b (i.e., the lateral end closest the central axis 442 is also closest to the flange portion 462). The tip portion 510 is similar in its construction to that of the tip portion 110 as the included angle, α, of the tip portion 510 ranges from about 30° to about 80° and is more preferably about 55°. In the particular embodiment illustrated, the tip portion 510 includes an edge 530 into which a plurality of teeth 536 are formed. However, the plurality of teeth 536 may alternatively be omitted from the edge 530 of the tip portion 510 so as to render the tip portion 510 flat, similar to the flat edge 130 of the tip portion 110 of the clip structure 22 (FIG. 10).

The characteristics of the clip structure 422 are generally very similar to those of the clip structure 22, particularly in terms of the ratio of insertion force to pull-out force. The employment of at least three wing members 500, however, permits the clip structure 522 to resist rotation after its installation to a higher degree relative to clip structure 22, rendering the clip structure 522 highly suited for applications wherein only one such clip is employed to secure two objects together. One such application concerns the mounting of a hook (not shown) to a vehicle body (not shown); the hook is conventionally mounted to the interior side of the roof of the vehicle body adjacent the rear side windows of the vehicle, permitting the vehicle operator and passengers to hang items, such as dry-cleaned laundry, for transport in the vehicle. In contrast to the applications illustrated in FIGS. 14 and 15 which employ multiple clip structures 22 to inhibit relative rotation between the clip structure 22 and the structure into which it is mounted, the wing members 500 of the clip structure 522 are configured to engage the structure into which the clip structure 522 is mounted to resist relative rotation without the cooperative efforts of other clip structures 522 or fasteners.

Figure 19:
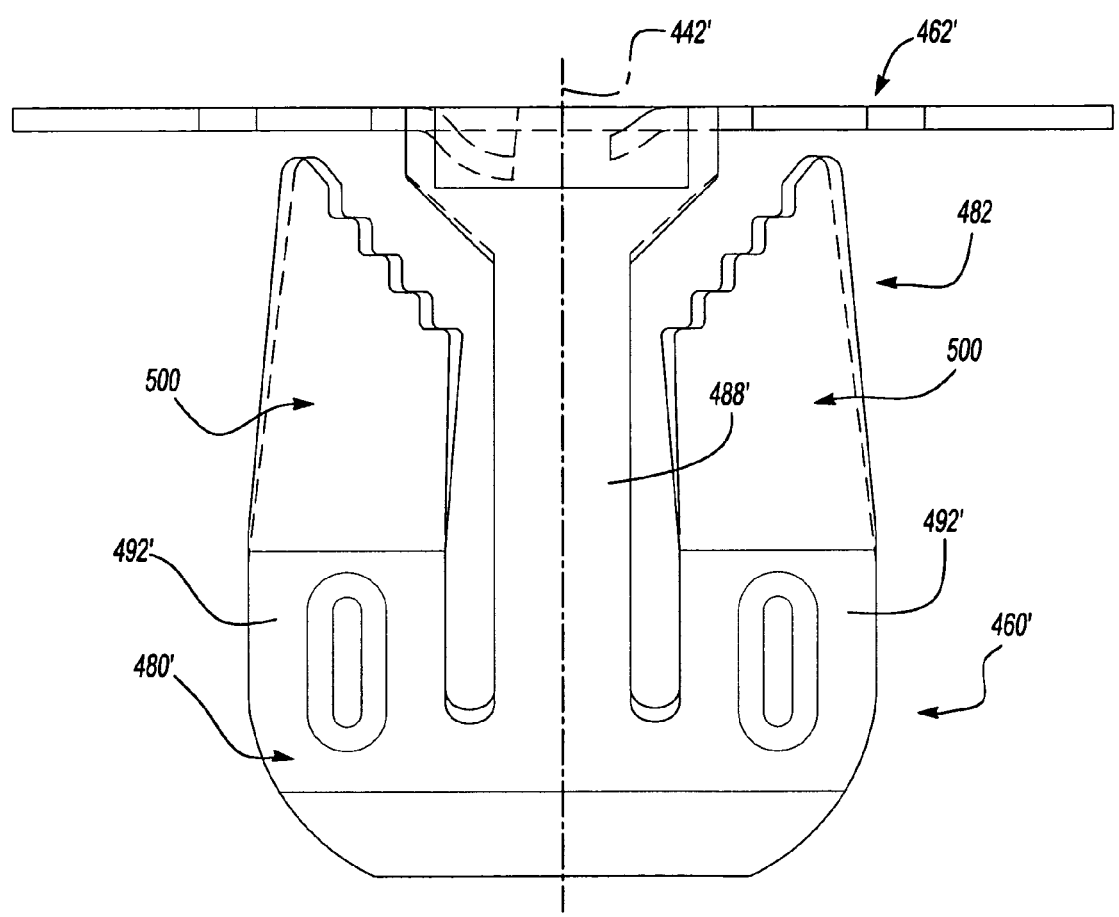
FIG. 19 is a front view of a clip structure similar to that of FIG. 16.
Figure 20:
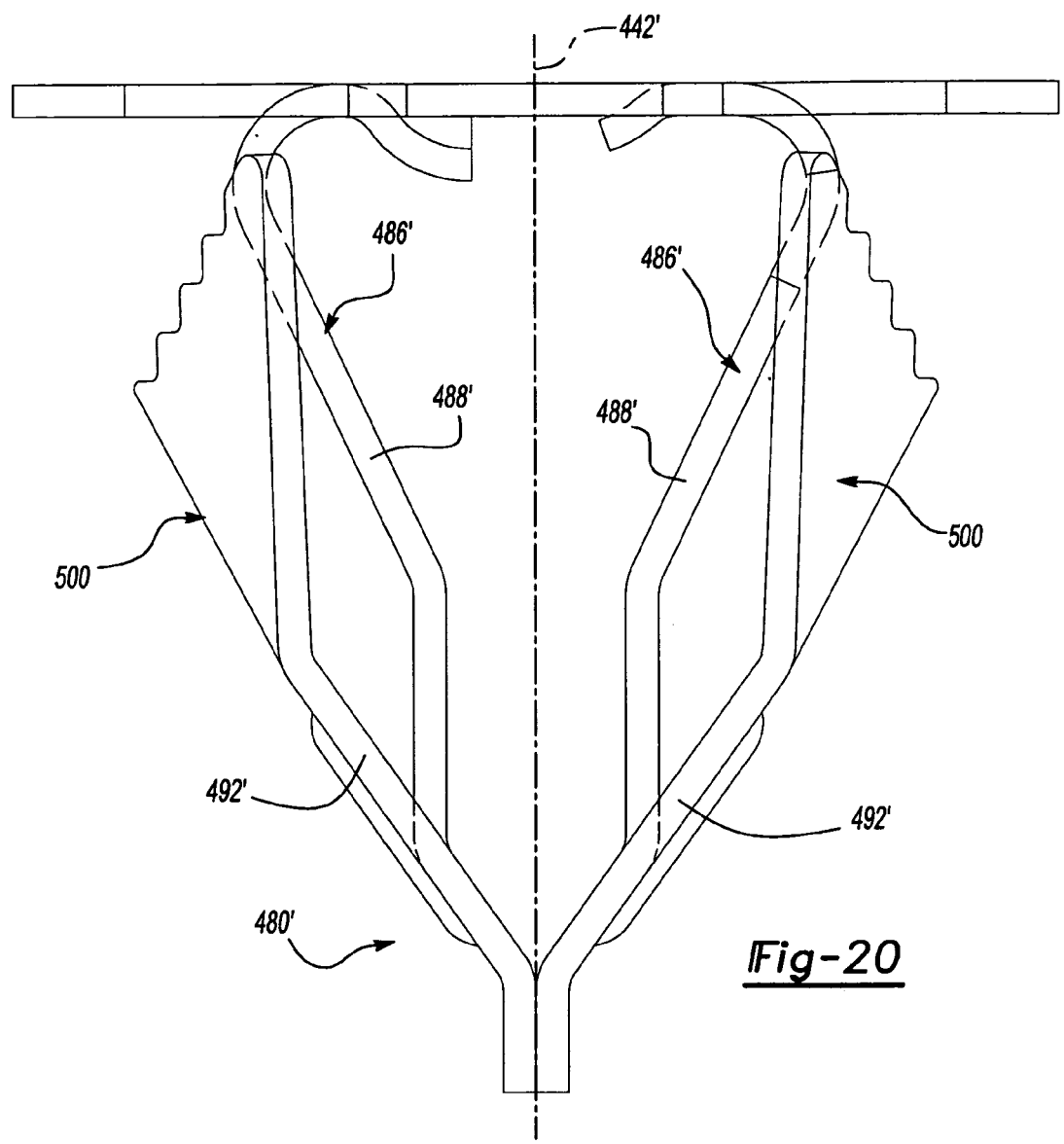
FIG. 20 is a side view of the clip structure of FIG. 19.

An alternate embodiment of the clip structure 522, which is designated by reference numeral 522', is illustrated in FIGS. 19 and 20. Clip structure 522' is generally similar to clip structure 522 and includes a flange portion 462' and a body portion 460' having an insertion portion 480' and the retaining portion 482 of clip structure 422. In the particular embodiment illustrated, the insertion portion 480' is shown to include a pair of flanges 486', with each of the flanges 486' having a first portion 488' and a second portion 492'. The first portion 488' is coupled to the flange portion 462' at a first end and tapers inwardly toward the central axis 442' and downwardly away from the flange portion 462'. The second portion 492' is coupled to an opposite end of the first portion 488' and tapers outwardly from the central axis 442' and upwardly toward the flange portion 462'. Configuration of the flanges 486' in this manner is advantageous in that it eliminates some of the forming steps that are required for forming of flanges 486. Accordingly, when compared with the clip structure 422, the clip structure 422' has the following benefits: reduced complexity resulting in lower tooling costs and shorter cycle times for forming the clip structure; and lower weight and cost as a result of using less material to form the flanges 486'.

Figure 21:
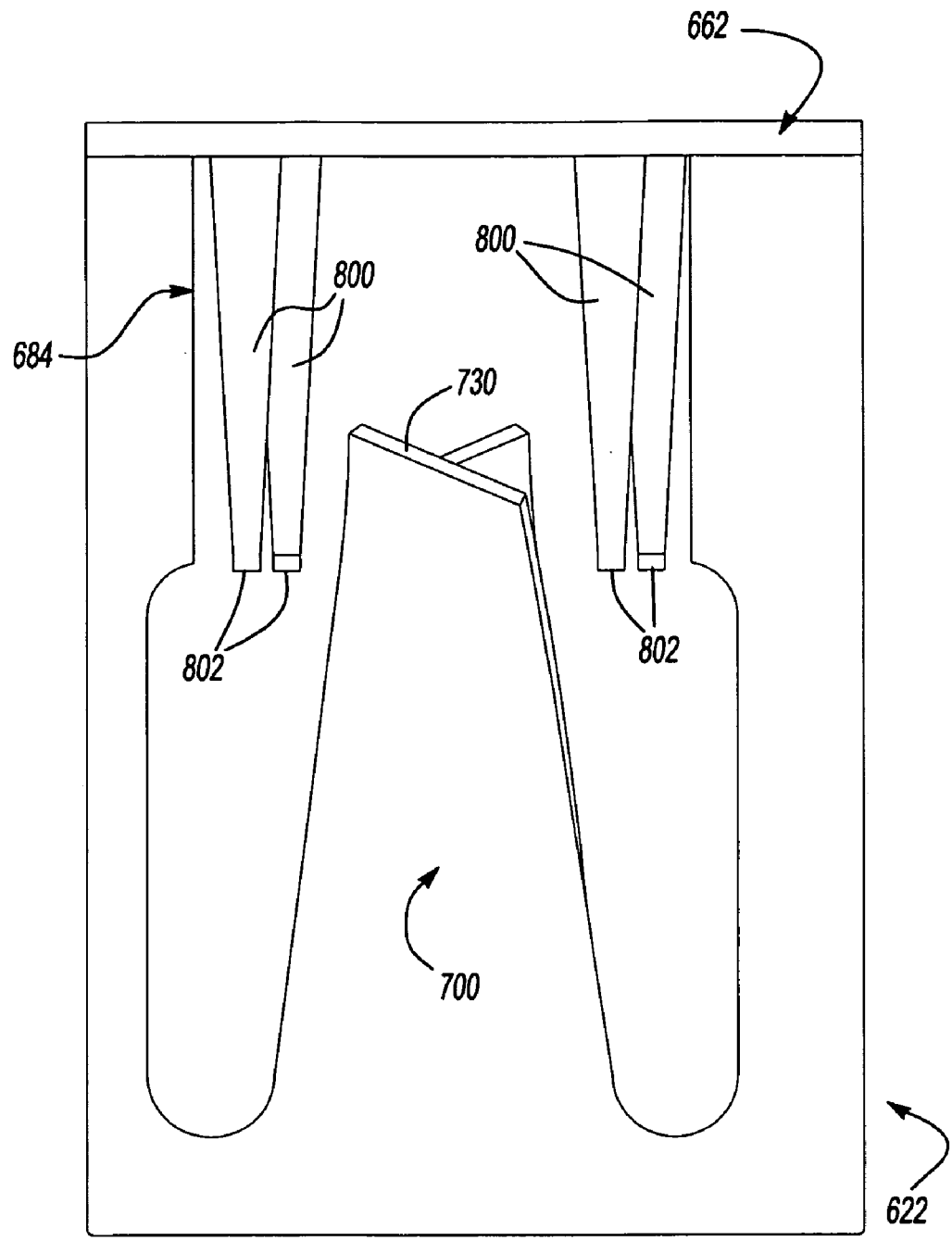
FIG. 21 is a front view of a clip structure constructed in accordance with the teachings of another preferred embodiment of the present disclosure.
Figure 22:
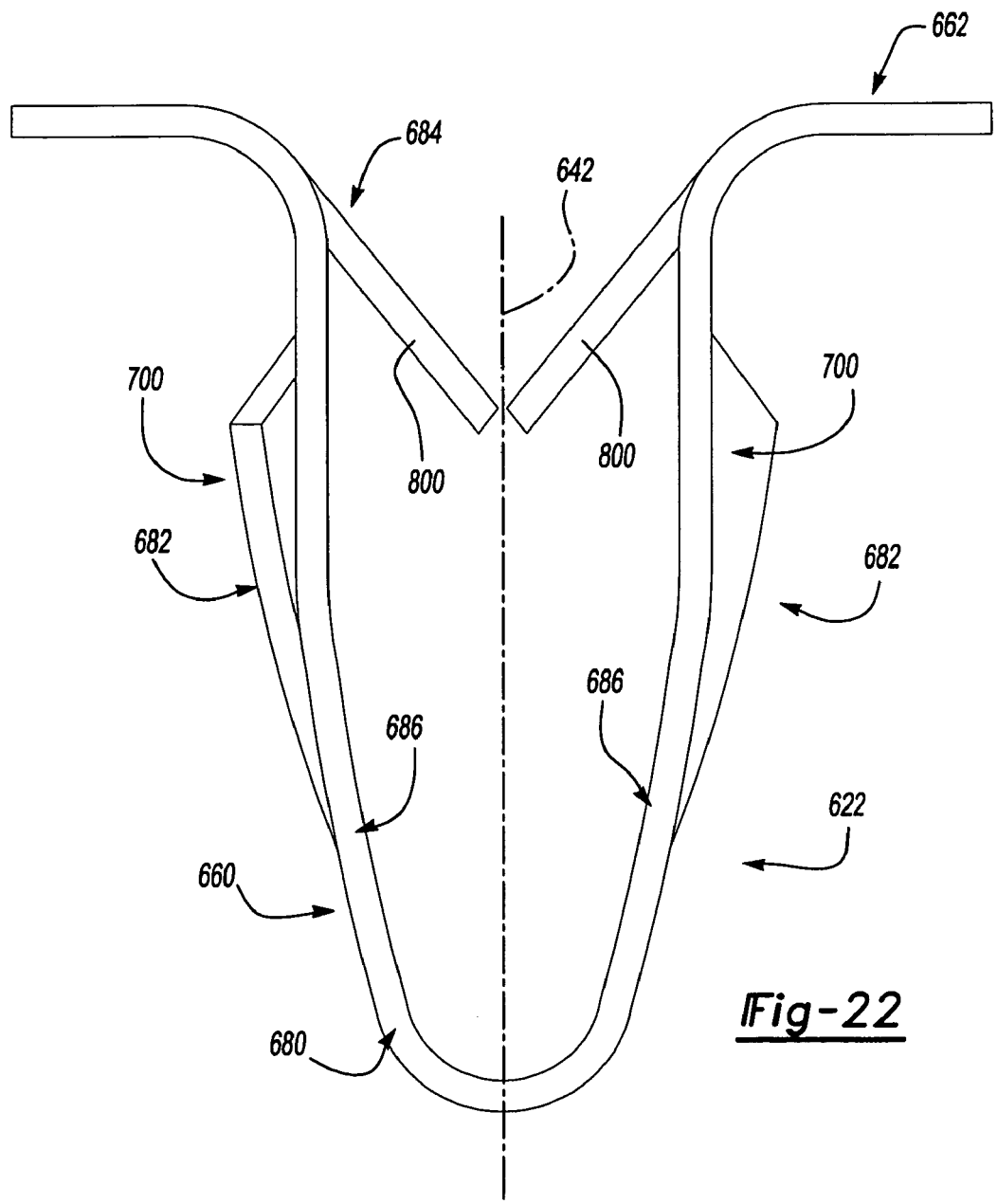
FIG. 22 is a side view of the clip structure of FIG. 21.
Figure 23:
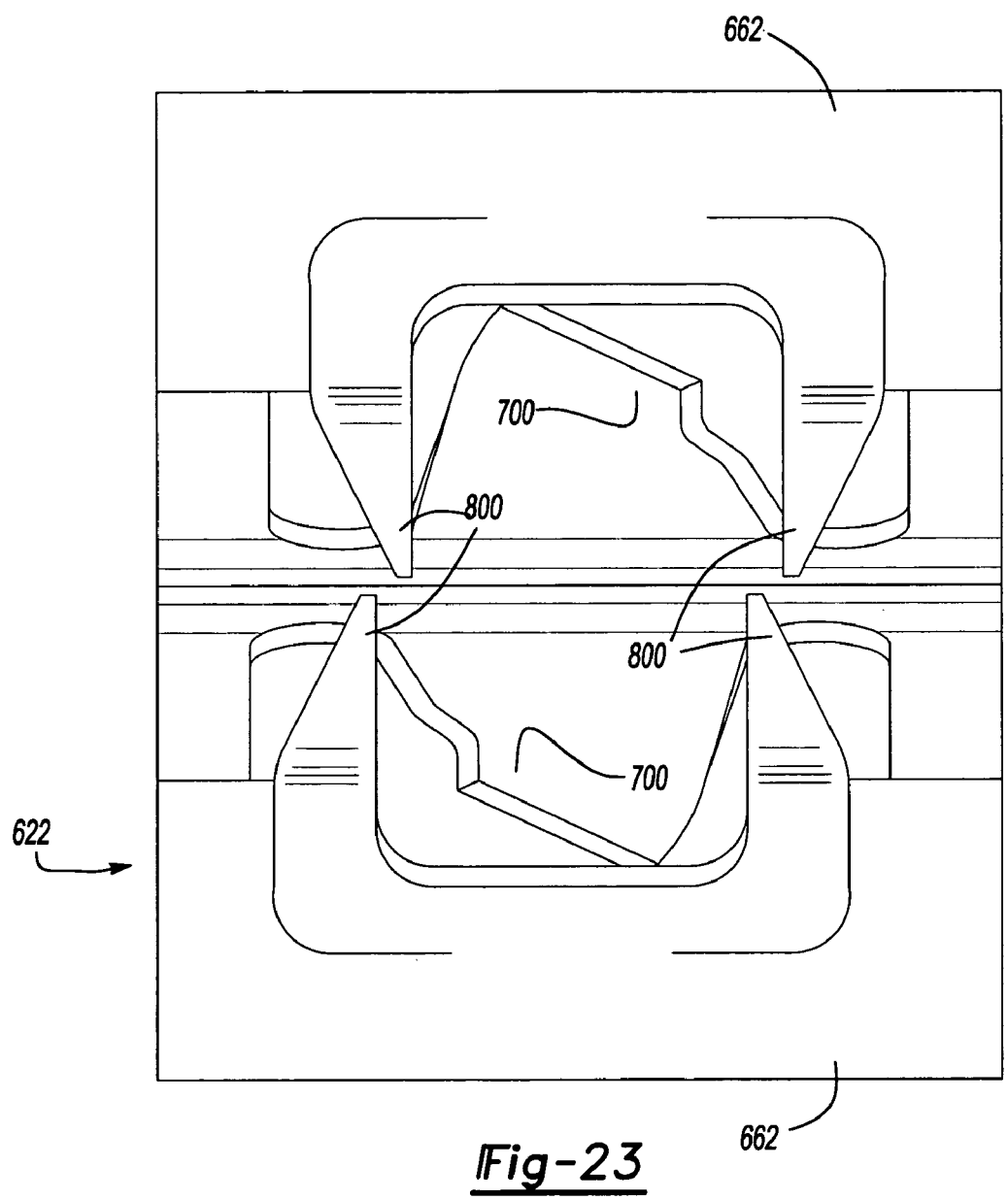
FIG. 23 is a top view of the clip structure of FIG. 21.

In FIGS. 21 through 23, a clip structure constructed in accordance with the teachings of another preferred embodiment of the present disclosure is generally indicated by reference numeral 622. The clip structure 622 is shown to be somewhat similar to the clip structure 22 in that it includes a body portion 660 and a flange portion 662. The flange portion 662 is shown to be a pair of tabs that extend outwardly generally perpendicularly from the body portion 660.

The body portion 660 is shown to include an insertion portion 680, a retaining portion 682 and an engagement portion 684. In the particular embodiment illustrated, the insertion portion 680 is shown to include a pair of flanges 686 that are coupled to one another to generally provide the insertion portion 680 with a U-shape. The flanges 686 of the insertion portion 680 are configured in a manner so as to resiliently position the retaining portion 682 relative to the flange portion 662. The resilient positioning of the retaining portion 682 facilitates the installation of the clip structure 922 as will be discussed in further detail, below.

The retaining portion 682 includes a pair of wing members 700 which are constructed generally identically to wing members 100 and as such, will not be discussed in detail herein. Briefly, each of the wing members 700 includes a base portion 708 that is fixedly coupled to the insertion portion 680 and terminates at a tip portion 710 that is twisted about an axis 712 to permit the clip structure 622 to be engaged to another structure (not shown). Like the tip portions 110 and 510 mentioned above, the tip portion 710 may include a flat edge 730, or the edge 730 may include teeth or have some other type of contour.

The engagement portion 684 is shown to include a plurality of teeth 800 that extend from the flange portion 662, tapering downwardly and inwardly toward the central axis 642. The teeth 800 are generally triangular in shape and terminate at a somewhat blunt tip 802.

Unlike clip structures 22 and 422, which are employed to removably couple an item to another structure, the clip structure 622 is intended to fixedly and permanently couple one item to another. One application is illustrated in FIG. 24 wherein the clip structure 622 is employed to fixedly couple a section of interior trim molding 820 to a vehicle body 822. The trim molding 820 includes a fastening tab 830 that extends generally perpendicularly outwardly from the body 832 of the trim molding 820. The fastening tab 830 includes a tab body 840 and a pair of abutting flanges 842 that are coupled to the opposite lateral sides of the tab body 840.

The clip structure 622 is engaged to the fastening tab 830 such that the teeth 800 of the engagement portion 684 slide over the surfaces of the tab body 840. The negative "rake" (i.e., inward and downward orientation) of the teeth 800 cause the tips 802 of the teeth 800 to "dig" into the tab body 840 to resist the removal of the clip structure 622 from the fastening tab 830. The abutting flanges 842 inhibit the clip structure 622 from sliding laterally relative to the tab body 840 so as to prevent the teeth 800 disengage the fastening tab 830.

With the clip structure 622 engaged to the fastening tab 830 on the trim molding 820, the insertion portion 680 of the clip structure 622 is placed proximate a clip aperture 850 in the vehicle body 822. The trim molding 820 is pushed toward the vehicle body 822 to push the insertion portion 680 of the clip structure 622 into the clip aperture 850 and cause the tip portions 710 of the wing members 700 to engage the vehicle body 822 in a manner similar to that described for the engagement of the tip portions 110 of the wing members 100, above. With the clip structure 622 engaged to the vehicle body 822, the flanges 686 will not spread apart sufficiently to permit the fastening tab 830 to be disengaged from the teeth 800 of the engagement portion 684. Accordingly, the clip structure 622 permits the trim molding 820 to be fixedly and permanently coupled to the vehicle body 822.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A fastener having an insertion axis, the fastener being configured to be inserted into an aperture in a structure along the insertion axis, the fastener comprising:

a U-shaped body having a pair of spaced apart legs and a pair of laterally extending flange members, each of the flange members being coupled to an associated one of the legs, the legs being coupled to one another at an end opposite the flange members;

a plurality of teeth coupled to the U-shaped body, each tooth extending inwardly away from an associated one of the legs toward the insertion axis and away from the flange members;

first and second wing members, each of the first and second wing members having a warped planar shape that includes a portion that is twisted, the warped planar shape with a first end that is coupled to the U-shaped body and a second free end opposite the first end, the second end terminating at a distal edge surface, the distal edge surface being sloped relative to the flange members in a vertical direction that is generally parallel to the insertion axis so that a first lateral side of the distal edge surface is relatively closer to the flange in a vertical direction than a second opposite lateral side of the distal edge surface; and wherein the distal edge surface extends in a helical manner between the first and second lateral sides.

2. The fastener of claim 1, wherein an angle between a lateral side of the wing member adjacent the first lateral side and the distal edge surface is about 30° to about 80°.

3. The fastener of claim 1, wherein the angle is about 60°.

4. The fastener of claim 1, wherein the distal edge surfaces are rotated about the insertion axis through an angle of about 5° to about 45° relative to a plane when the fastener is viewed in a top plan view from a direction that is parallel to the insertion axis, the plane including the insertion axis and extending through the fastener such that each of the generally U-shaped portions are on an opposite side of the plane.

5. The fastener of claim 4, wherein the angle is about 30°.

6. The fastener of claim 1, wherein the distal edge surface is flat.

7. The fastener of claim 1, wherein the plurality of teeth consists of a first pair of teeth and a second pair of teeth, the first pair of teeth being coupled to a first side of the U-shaped body and being disposed on opposite sides of the first wing member, the second pair of teeth being coupled to a second side of the U-shaped body opposite the first side, the second pair of teeth being disposed on opposite sides of the second wing member.

8. A fastener having an insertion axis, the fastener being configured to be inserted into an aperture in a structure along the insertion axis, the fastener comprising:

a body having a pair of spaced apart resilient legs and a pair of laterally extending flange members, each of the flange members being coupled to an associated one of the resilient legs;

a plurality of teeth coupled to the body, each tooth extending inwardly away from an associated one of the resilient legs toward the insertion axis and away from the flange members;

a plurality of wing members, each wing member having a warped planar shape, the warped planar shape being a twisted plane, each wing member including a first end that is coupled to an associated one of the resilient legs and a second free end opposite the first end, the second end terminating at a distal edge surface, the distal edge surface being sloped relative to the flange in a vertical direction that is generally parallel to the insertion axis so that a first lateral side of the distal edge surface is relatively closer to the flange in the vertical direction than a second opposite lateral side of the distal edge surface; and wherein the distal edge surface extends in a helical manner between the first and second lateral sides.

9. The fastener of claim 8, wherein an angle between a lateral side of the wing member adjacent the first lateral side and the distal edge surface is about 30° to about 80°.

10. The fastener of claim 9, wherein the angle is about 60°.

11. The fastener of claim 8, wherein the distal edge surfaces are rotated about the insertion axis through an angle of about 5° to about 45° relative to a plane when the fastener is viewed in a top plan view from a direction that is parallel to the insertion axis, the plane including the insertion axis and extending through the fastener such that each of the resilient legs are on an opposite side of the plane.

12. The fastener of claim 11, wherein the angle is about 30°.

13. The fastener of claim 8, wherein the plurality of teeth includes a first pair of teeth, the first pair of teeth being coupled to a first one of the flange members and being disposed on opposite lateral sides of a first one of the wing members.

14. The fastener of claim 13, wherein the plurality of teeth includes a second pair of teeth, the second pair of teeth being coupled to a second one of the flange members and being disposed on opposite lateral sides of a second one of the wing members.

15. The fastener of claim 14, wherein the resilient legs are coupled to one another on a side opposite the flange members.

16. The fastener of claim 8, wherein the distal edge surface is flat.

* * * * *